United States Patent [19]
Okamura et al.

[11] 4,332,023
[45] May 25, 1982

[54] STATIONARY RECORD PLAYER

[75] Inventors: Yasushi Okamura; Kiichiro Tanaka, both of Fukuoka, Japan

[73] Assignee: Matsushita Electric Industrial Co., Ltd., Kadoma, Japan

[21] Appl. No.: 136,827

[22] Filed: Apr. 3, 1980

Related U.S. Application Data

[62] Division of Ser. No. 952,389, Oct. 18, 1978, Pat. No. 4,232,868.

[30] Foreign Application Priority Data

| Oct. 19, 1977 | [JP] | Japan | 52-126266 |
| Oct. 19, 1977 | [JP] | Japan | 52-126267 |
| Oct. 19, 1977 | [JP] | Japan | 52-126268 |
| Feb. 20, 1978 | [JP] | Japan | 53-18963 |
| Mar. 6, 1978 | [JP] | Japan | 53-25568 |
| Mar. 23, 1978 | [JP] | Japan | 53-33864 |
| Mar. 24, 1978 | [JP] | Japan | 53-34455 |

[51] Int. Cl.³ ............................................. G11B 3/40
[52] U.S. Cl. .................................................. 369/177
[58] Field of Search .................. 369/67, 177, 225, 226

[56] References Cited

U.S. PATENT DOCUMENTS

| 3,193,295 | 7/1965 | Isemura | 369/177 |
| 3,224,782 | 12/1965 | Isemura | 369/177 |
| 3,484,111 | 12/1969 | Staar | 369/177 |
| 3,589,735 | 6/1971 | Watanabe | 369/67 |
| 3,984,111 | 10/1976 | Hughes | 369/67 |

Primary Examiner—John W. Shepperd
Attorney, Agent, or Firm—Stevens, Davis, Miller & Mosher

[57] ABSTRACT

A stationary record player having a turn table and a pickup pivotally secured to the turn table, so as to trace, when rotated together with the turn table, the recording groove of a stationary record medium on which the record player as a whole is placed. The record player has various novel functions such as an automatic stopping function for automatically stopping the player when the play is finished with the record medium, an automatic returning function for automatically resetting the stylus to the starting position, a lift-stop function for automatically stopping the player when the latter is lifted up from the record medium a slide-stop function for automatically stopping the player when the latter is displaced laterally from the correct mounting position on the record medium, a pause state eliminating function for stopping the player when the latter in the pause state is lifted up from the record disc, and so forth. These functions are effective to prevent the unnecessary wear of the stylus and to protect the latter from any damaging external force. Further, the force required for turning the player into operation is derived from a motor for driving the turn table, so as to obtain an improved operability of the player. The playing performance of the player is further improved by an additional provision of an end repeat and optional repeat functions by means of which the playing is performed repeatedly over the full or a desired part of the record medium.

7 Claims, 32 Drawing Figures

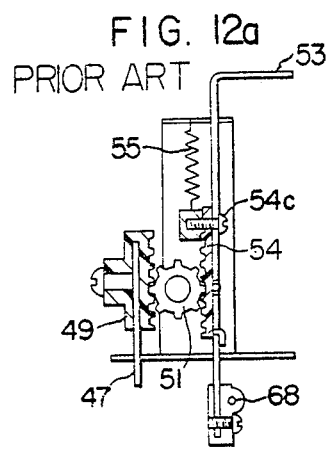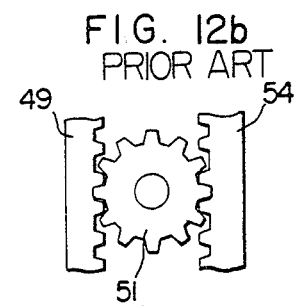

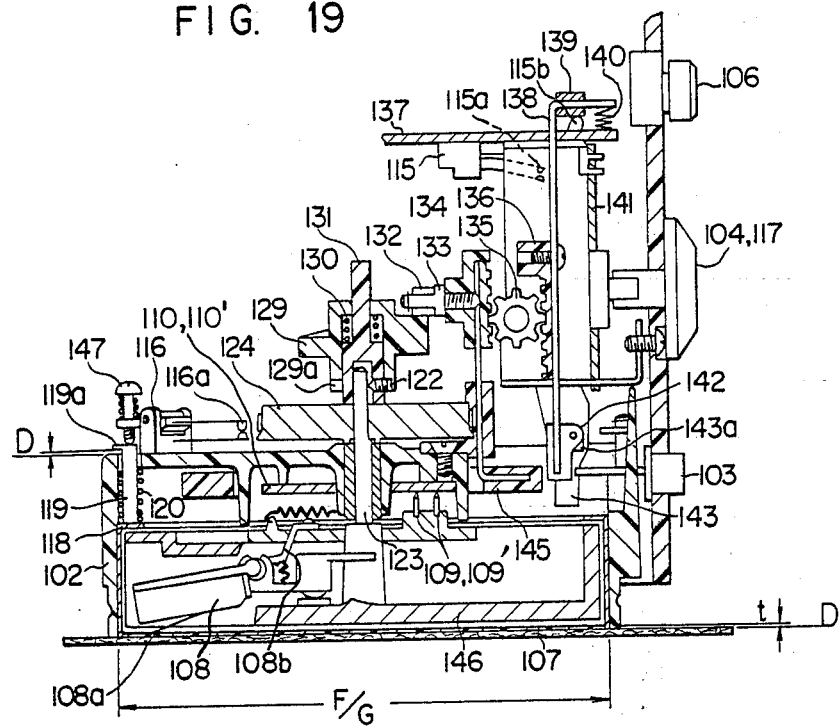
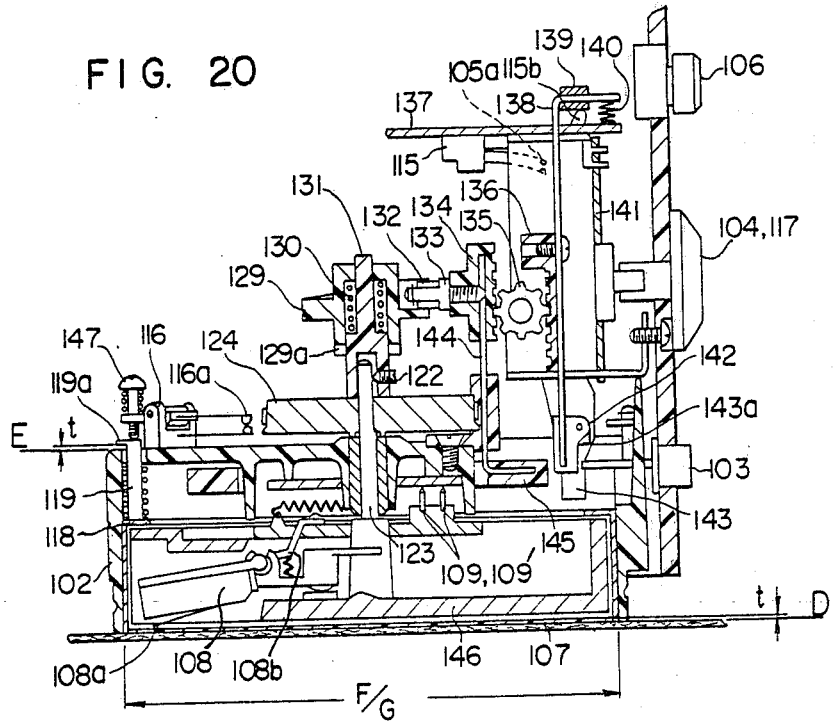

STATIONARY RECORD PLAYER

This is a division of application Ser. No. 952,389 filed Oct. 18, 1978 now U.S. Pat. No. 4,232,868.

BACKGROUND OF THE INVENTION

The present invention relates to a stationary record player and, more particularly, an automatic stationary record player having various functions.

Such a record player has been known as being adapted to be placed on a stationary record disc stuck to a picture book or the like printed matter, so as to reproduce the signal recorded in the record medium. This type of record player is generally referred to as a stationary record player.

This type of record player, however, has no means adapted to stop the playing operation automatically upon detection of the completion of the playing of one record. Thus, in the prior stationary record player, it is necessary to mainpulate a stop button, when the playing of one record is completed as well as when it is desired to stop the playing operations. Therefore, if the manipulation of the stop button is missed upon the completion of the playing, the playing operation is continued without making reproduction of signals, so as to unnecessarily wear the stylus record medium. At the same time, in the prior stationary record player, the playing operation is continued even when the player happens to be turned or when the player is moved away from the record medium. If the player in the playing condition is erroneously placed on an other object than the record medium, e.g. a desk or the like, the stylus runs on the surface of the object, so as to be seriously damaged. For the same reason, if a person happens to put his hand in contact with the lower surface of the player, the hand may be dangerously scratched by the stylus.

Further, in the prior stationary record player, it is necessary to provide a spring which always biases the pickup or the pickup support radially outwardly, i.e. toward the outside of the disk, for ensuring the resetting of the player to the starting condition after the playing. Consequently, a large bias force is applied to the pickup radially outwardly, even during the playing. At the same time, since the pickup is rotated together with the turn table, the pickup is biased radially outwardly also by a centrifugal force. These forces inconveniently hinder the pickup in the smooth movement toward the inside of the turn table.

At the same time, in the prior stationary record player, the arrangement is such that the push button for actuating the play-start switch should be locked in the depressed condition during the suspension of the playing. For starting the playing the push button for the play-start switch is unlocked by being further depressed and then allowed to push out by a predetermined stroke, so as to cause the pickup to drop onto the surface of the record disc. This manner of operation is quite contrary to the operation of the ordinary push-button type record player in which the playing is started by depressing the push button and the lifting and resetting of the pickup is caused by the release of the push button. Therefore, such an operation causes quite an awkward manipulation in use.

SUMMARY OF THE INVENTION

It is therefore an object of the invention to provide a stationary record player capable of overcoming the aforementioned problem in the prior stationary record player having no means for automatically stopping the operation upon the detection of the completion of the playing.

It is another object of the invention to provide a stationary record player in which the radially outward biasing force exerted by the resetting spring is effectively negated during the playing, so as to ensure the smooth movement of the pickup toward the inside of the turn table.

It is still another object of the invention to provide a stationary record player which can offer an easy manipulation in use to the user, in connection with the push button manipulation.

It is a still further object of the invention to provide a stationary record player in which the motor for driving the turn table is used also as the power source for driving the mechanism for starting the playing operation, thereby to improve case of manipulation of the player.

It is a still further object of the invention to provide a stationary record player capable of performing repetition of playing over the full or a part of the record disc.

To this end, according to the invention, there is provided a stationary record player having a turn table adapted to be rotatively driven by an electric motor or the like, and a pickup pivotally secured to the turn table, the pickup having a stylus adapted to scan a stationary record medium as the pickup is rotated together with the turn table, so as to reproduce the signal recorded on the record medium, characterized by comprising a lift member adapted to detect the arrival of the stylus at the final position of reproduction, and an automatic stopping mechanism adapted to release a play lever from a locked state in response to the operation of the lift member so as to automatically bring the player into the suspended condition.

These and other objects, as well as advantageous features of the invention will become clear from the following description of the preferred embodiments taken in conjunction with the accompanying drawings.

BRIEF DESCRIPTION OF THE DRAWINGS

FIGS. 1 to 12 in combination show a first embodiment of the invention,

FIGS. 13 to 24 in combination show a second embodiment of the invention and,

DESCRIPTION OF THE PREFERRED EMBODIMENTS

Figure 1:
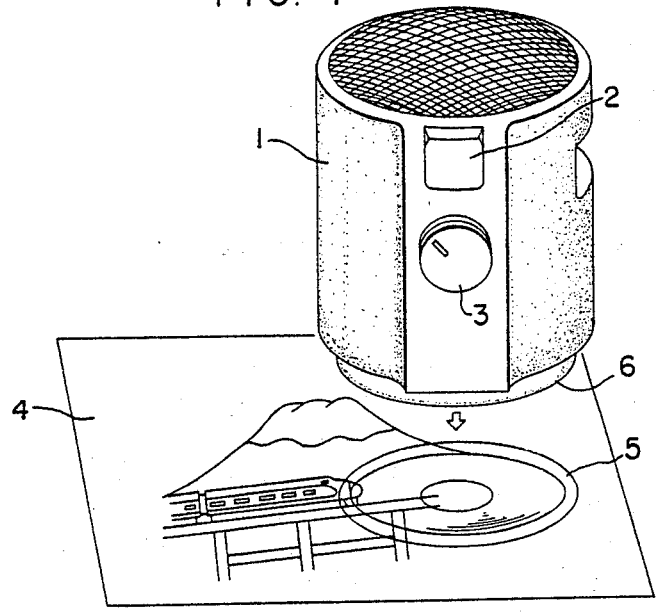
Figure 2:
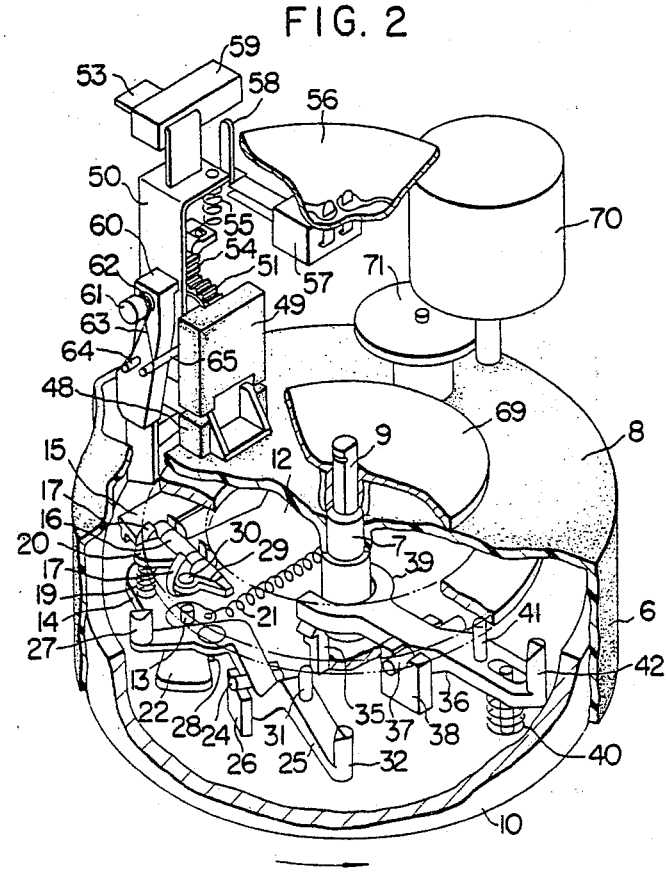
Figure 3:
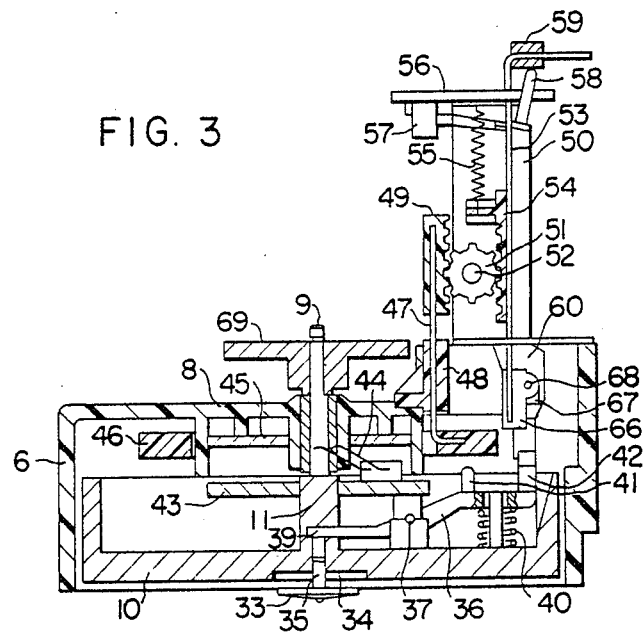
Figure 9:
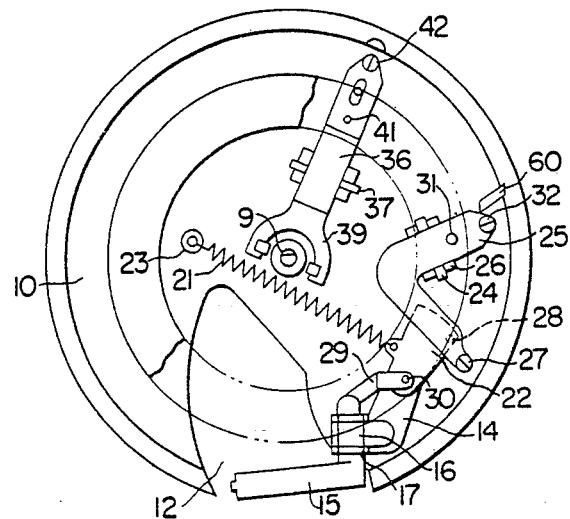

The first embodiment of the invention will be described in detail, hereinafter, with reference to the accompanying drawings. Referring to the drawings FIGS. 1 to 12b, a cylindrical case 1 made of a synthetic resin constitutes the body of the stationary record player of this embodiment. A play button 2, which is attached to the end of a later-mentioned play lever, is mounted on a same side of the case 1 as a volume adjusting dial 3. The record player as a whole is adapted to be placed on a record medium 5 stuck to a carrier paper 4 such as a page of a picture book or the like printed matter. The case 1 is provided at its inner lower side end with a record guide 6 for fitting onto the outer periphery of the record medium 5. Referring specifically to FIG. 2, a bearing assembly 7 is attached to the ceiling 8 of the record guide 6. The bearing assembly 7 rotatably receives a rotary shaft 9. As shown in FIG. 3 a turn table 10 has a shaft 11 connected to the lower end of the rotary shaft 9. As clearly shown in FIG. 9 the turn table 10 has an arcuate opening 12 formed therein, and a projecting boss 13 (FIG. 5) for attaching a pickup assembly in the vicinity of the arcuate opening 12. A pickup support 14 is pivotally secured to the boss 13 for free horizontal swinging movement. The pickup assembly designated at a reference numeral 15 has a rear end journal portion 16 pivoted to a bearing piece 17 provided on the pickup support 14, and a front end portion carrying a stylus 18 and adapted to move to and from a position under the turn table 10, through the arcuate opening 12. A spring 19 is disposed between a tab 20 formed on the journal portion 16 of the pickup assembly 15 and the pickup support 14, so as to bias the pickup 15 toward the position under the turn table 10 through the opening 12. The journal portion 16 has a projection 29 extending, laterally upwardly. Another spring 21 is stretched between a sector-shaped tab 22 and another pin 23 (See FIGS. 9 and 10) on the turn table 10 so as to bias the pickup 15 toward such position that the front end of the latter is just above the leading groove in the record medium 5.

A see-saw member 25 for automatically stopping the operation of the device is rotatably supported by a bearing piece 26 through a shaft 24. A projection 28 formed on the lower surface of the see-saw member 25 normally applies a biasing force under gravity to the tab 22. Reference numerals 27, 32 denote columnar projections having tapers, integrally mounted on the see-saw member 25. Another projection 31 having a hemispherical end is also integrally mounted on the see-saw member 25.

A stop button 33 is mounted so as to freely come into and out of a recess 34 formed in the center portion of the lower surface of the turn table 10. The stop button 33 has a leg 35 which projects above the turn table 10. A stop plate 36 has a central journal portion 37 pivoted to a bearing piece 38 mounted on the upper surface of the turn table 10, and one end having an arcuate portion 39 adapted to cooperate the leg 35 of the stop button 33. A spring 40 disposed between the turn table 10 and the other end of the stop plate 36 is adapted to normally bias the latter upwardly. Projections 41, 42 formed on the upper surface of the other end of the stop plate 36 have a hemispherical end and a tapered end, respectively.

As clearly shown in FIG. 3, a brush attaching plate 43 is fitted onto the shaft 11 of the turn table 10 and has a pair of brushes 44 which are electrically connected to the pickup 15. A slip ring 45 has two conductive bodies which are adapted to be kept in contact with respective one of the brushes 44, and is attached to the ceiling 8 of the record guide 6. A hollow disk-shaped lift plate 46 is disposed above the projections 29, 31 and 41, so as to oppose to the end 30 of the projection 29 formed on the journal portion 16 of the pickup assembly 15, the ends of projection 31 formed on the see-saw member 25 and of the projection 41 formed on the stop plate 41. A lift lever 47 is mounted vertically movably through a bearing body 48 attached to the ceiling of the record guide 6, and is connected at its lower end to the lift plate 46. A rack 49 is connected to the upper end of a lift lever 47.

A chassis 50 attached to the ceiling 8 of the record guide 6 carries a pinion 51 through a shaft 52. The pinion 51 is normally held in engagement with the rack 49. Reference numeral 53 denotes a play bar secured to the chassis 50 so as to be allowed of free vertical movement, and having at its mid portion a rack 54 which engages the pinion 51. A spring 55 stretched between the rack 54 and the chassis 50 is adapted to normally bias the rack 54 and the play bar 53 upwardly. Reference numerals 56 and 57 denote, respectively, a switch lever mounted on the chassis 50 and a power switch. A connecting piece 59 for actuating the switch lever 58 is attached to the upper end of the play lever 53. A heart cam plate 60 is secured to one side surface of the chassis 50 by means of a pin 61 so as to pivot in a vertical plane around the pin 61. A spring 62 retained by the pin 61 is adapted to normally bias the heart cam plate 60 toward the chassis 50. Another spring 63 is stretched by way of the pin 61 between pins 64 and 65 which is respectively secured on the heart cam plate 60 and the chassis 50 so as to bias them toward each other. A drive plate 66 attached to the lower end of the play lever 53, has a pin 68 which is received by a heart cam portion 67 of the heart cam plate 60.

Reference numerals 69, 70 and 71 denote, respectively, a pulley, a motor and an idler by means of which the motor 70 drives the pulley 69.

The lower end of the heart cam plate 60 projects below the ceiling 8 of the record guide 6, and is positioned above the path or locus along which the projections 32, 27 of the see-saw member 25, as well as the projection 42 of the stop plate 36 are moved as the turn table 10 is rotated.

Hereinafter, the operation of the record player having the above construction will be described.

Figure 4:
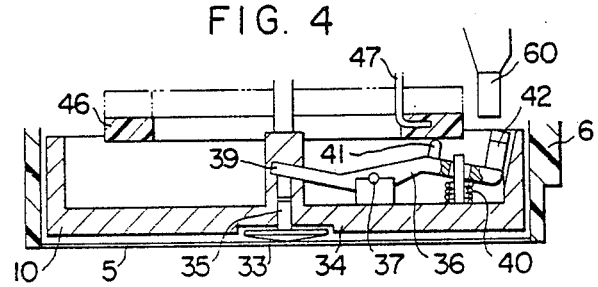
Figure 5:
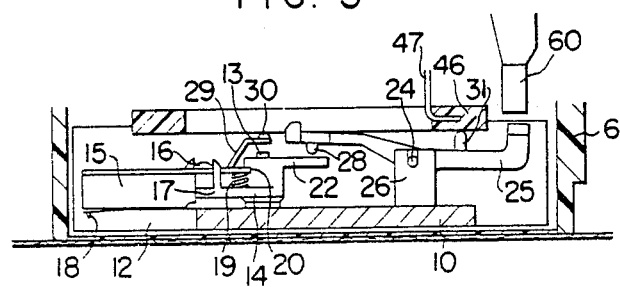

Assuming that the play lever 53 is positioned at the lifted position a shown in FIG. 2, the lift lever 47 is located in the lower position thereof due to the arrangement of the racks 49, 54 and the pinion 51, and is stopped with the rack 49 abutting the bearing body 48. In this state, the connecting piece 49 is not in contact with the switch lever 58 so that the power switch 57 is in the off state to keep the motor 70 not operated. At the same time, since the lift plate 46 is kept at the lower portion, the projection 41 on the stop plate 36, the end 30 of the projection 29 on the journal portion 16 of the pickup 15, and the projection 31 on the see-saw member 25 are all depressed downward by the lift plate 46, as shown in FIGS. 4 and 5. Consequently, the stop plate 36 is kept urged clockwise around the central journal portion 37, as shown in FIG. 4, so that the pickup 15 is completely retracted above the turn table 10, as shown in FIG. 5, that is, the pickup assembly 15 does not project downwardly though the opening 12 of the turn table 10. Further, since the see-saw member 25 is displaced such that its projection 28 is located higher than the sector-shaped tab 22 of the pickup support 14, as shown in FIG. 5, the pickup support 14 is rotatable around the projecting boss 13. Consequently, the pickup support 14 is moved by the force of the spring 21 such that the pickup assembly 15 is moved toward the outermost portion of the turn table, i.e. toward the starting position of the playing.

In this state, as the play button 2 is depressed downward to move the play lever 53 downward, the connecting lever 59 provided on the play lever 53 comes to depress the switch lever 58 downward, so that the power switch 57 is turned on to allow the power supply to feed its power to the motor 70 so as to start the latter. The output torque of the motor 70 is transmitted to the rotary shaft 9 through the idler 71 and the pulley 69 so that the turn tale 10 starts to rotate in the direction of arrow in FIG. 2. Then, as the play lever 53 is further depressed, the lift lever 47 is moved upward as shown in FIG. 3, due to the action of racks 54, 49 and the pinion 51. And therefore, the lift plate 46 is moved to the raised position as shown in FIGS. 3 and 6.

For obtaining a smooth manipulation through means consisting of the racks 54, 49, it is necessary to provide suitable clearances between the meshing gear teeth, i.e. the back-lash. Provided that the first rack 54 is rigidly secured to the play lever 53 by means of screws 54c as shown in FIG. 12a, the lever 53 and the first rack 54 are held at a predetermined position determined by the engagement of the lack pin 68 and the heart cam plate 60 so as to allow a constant stroke. However, because of the presence of the above-mentioned back-lash, it is extremely difficult to obtain a constant meshing condition of the first rack 54 and the pinion 51 with each other. More specifically, referring to FIG. 12b, it may not be determined in which direction the clearance between the first rack 54 and the pinion 51 is narrowed as well as in which direction the clearance between the pinion 51 and the second rack 49 is narrowed. Therefore, it is impossible to obtain a constant displacement of the second rack 49. This adversely affects the precision of the displacement of the lift plate 46 and also the precision of the vertical movement of the pickup assembly 15.

Figure 11A:
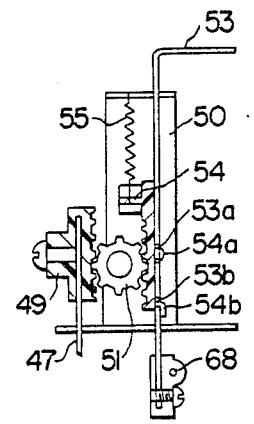
Figure 11B:
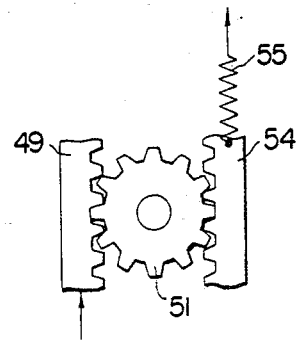

To avoid this, according to the invention, as shown in FIG. 11a, the first rack 54 is not fixed to the play lever 53 by screws but, instead, the pins 54a, 54b of the first rack 54 are loosely received by openings or bores 53a, 53b formed in the play lever 53. Therefore, the first rack 54 lifted is upwardly urged by the spring 55 by a distance corresponding to the play between the pins 54a, 54b and the bores 53a, 53b, while the play lever 53 is held in the constant position determined by the engagement of the lock pin 68 and the heart cam plate 60. In addition, in the rest condition as shown in FIG. 4, the second rack 49 is biased in the same direction as the first rack 54 through the lift plate 46 and the lift lever 47 by the stop plate 36 which in turn is pushed up by the spring 40. Consequently, as shown in FIG. 11b, a constant meshing condition is maintained as shown in FIG. 11b between the racks 54, 49 and the associated pinion 51. Therefore, the back-lash for the upward movement is negated and only the downward back-lash is left. This means that the lift plate 46 is affected only by the downward back-lash, so that the displacement of the lift plate 46 is controlled much more precisely as compared with the case of FIGS. 12a and 12b. By applying biasing forces to the first and the second racks 54, 49 in the same direction, both biasing forces are conveniently negated by each other so that the operation of the play lever 53 does not become heavy.

Figure 6:
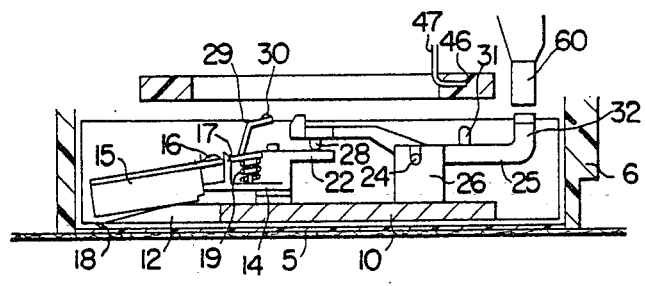

Then, as the lift plate 46 is moved upwardly as shown in FIGS. 3 and 6, the projection 41 of the stop plate 36, end 30 of projection 29 on the journal portion 16 of the pickup, assembly 15 and the projection 31 of the see-saw member 25, which have been depressed by the lift plate 46 are all free from the latter. Therefore, the pickup assembly 15 is allowed to project downwardly through the opening 12 formed in the turn table 10, by the force of the spring 19 so that the stylus 18 is lowered to the starting groove in the record medium 5, as shown in FIG. 6. Meanwhile, the see-saw member 25 is swung counter-clockwise around a fulcrum constituted by the shaft 24 so as to bring the end of the projection 28 into engagement with the upper face of the sector-shaped tab 22 of the pickup support. On the other hand, the stop plate 36 is apt to swing counter-clockwise due to the force of the spring 40. However, when the record medium 5 is positioned beneath the record player 1, the stop plate 36 is kept in the clockwise urged position as shown in FIG. 4, because the stop button 33 is pushed up by the record disc 5.

Therefore, in this state, the projections 27, 32 of the see-saw member 25 and the projection 42 of the stop plate 36 are positioned below the lower end of the heart cam plate 60 so as not to be contacted by the latter even when the turn table 10 is rotated. Therefore, the turn table 10 is allowed to continue its rotation so that the pickup assembly 15, which rotates together with the turn table 10, traces the grooves in the record medium 5, thereby to reproduce the signal recorded on the latter.

The reproduced output from the pickup assembly 15 is then delivered through the brushes 44 and the slip ring 45 to an amplifier (not shown) provided on the printed substrate 56 so as to be amplified by the amplifier. The output from the amplifier is transmitted to the speaker (not shown) attached to the ceiling of the case 1 so as to be changed into an acoustic signal.

This playing condition is held, because the downwardly depressed play lever 53 is locked in the depressed position by the action of the pin 68 and the heart cam portion 67 of the heart cam plate 60. This locking is unlocked by either one of a further depression of the play lever 53 and a movement of the heart cam plate 60 away from the chassis 50. Namely, the play lever 53 and the heart cam plate 60 constitute a so-called push-push mechanism. As the play lever 53 is moved downward, the pin 68 comes to be locked by the heart cam 67 so that the play lever 53 is latched at the lowered position. Consequently, the members associated with the play lever 53 are held in the playing condition so that the pickup assembly 15 is rotated together with the turn table 10 so as to continue the playing. As the playing proceeds, the pickup assembly 15 is swung gradually toward the center of the turn table 10.

In this state, the projection 28 formed on the lower surface of the see-saw member 25 is kept in contact with the sector-like tab 22 formed on the pickup support 14. It is possible to negate the radially outward biasing force acting on the pickup assembly 15, i.e. the force of the spring 21 and the centrifugal force attributable to the rotation of the pickup 15, by making use of the mutual contact of the projection 28 and the sector-shaped tab 22. More specifically, the upper surface of the tab 22 upon which the projection 28 rests is tapered so that a radially inward biasing force may be applied to the pickup assembly 15, thereby to negate the radially outward biasing force exerted by the spring 21. At the same time, a small movement of the pickup assembly 15 is effectively damped by the friction between the sector-shaped tab 22 and the projection 28.

Figure 7:
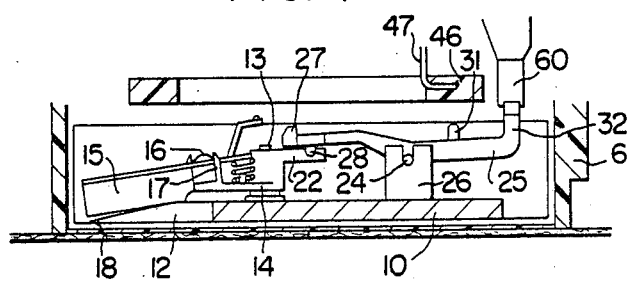
Figure 8:
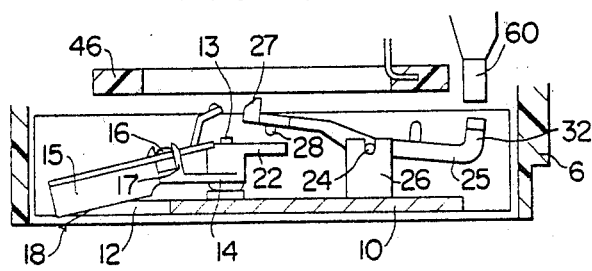
Figure 10:
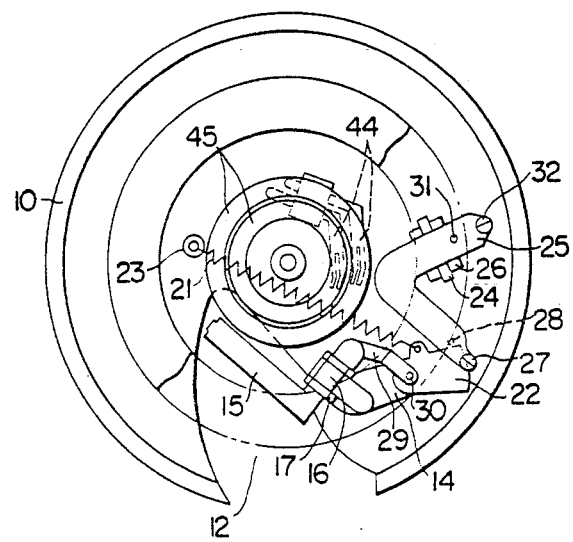

As the playing proceeds, the pickup assembly 15 is moved along the recording groove in the record medium 5 toward the center of the turn table 10, as shown in FIG. 10. When the stylus 18 reaches the final position of playing, the sector-shaped tab 22 has been moved to a position where it cannot engage the projection 28 of the see-saw member 25. Consequently, the see-saw member 25 is swung counter-clockwise around the shaft 24, due to its weight, until the lower surface thereof comes into contact with the upper surface of the sector-shaped tab 22, as shown in FIG. 7. In this state, the see-saw member 25 is inclined. This arrangement ensures that the stylus 18 is allowed to be moved upwardly only after it has been introduced into the lead-out groove beyond the recording groove so that the damaging of the recording groove is avoided due to the lifting of the stylus. At the same time, the columnar projection 32 provided on the see-saw member 25 comes to a position higher than the lower end of the heart cam plate 60. Consequently, the projection 32 is contacted by the lower end of the heart cam plate 60, while the see-saw member 25 makes one rotation together with the turn table 10.

As the lower end of the heart cam plate 60 is pressed by the projection 32, the heart cam plate 60 is swung around the pin 61 away from the chassis 50, so that the pin 68 of the drive plate 66 provided at the lower end of the play lever 53 is disengaged from the heart cam portion 67 of the heart cam plate 60. Consequently, the play lever 53, which has been prevented from moving upward due to the cooperation of the pin 68 and the heart cam portion 67, is moved upward automatically by the force of the spring 55. This in turn causes a downward movement of the lift lever 47, through the action of the racks 54, 49 and the pinion 52. Consequently, the power switch 57 is turned off to stop the power supply to the motor 70 so that the turn table 10 is stopped.

At the same time, the downward movement of the lift plate 46 allows the pickup 15 to move upward away from the record medium. Simultaneously, the see-saw member 25 is moved downward by the lift plate 46 so that the projection 28 on the see-saw member 25 comes to a position above the tab 22 of the pickup support 14. The pickup support 14 is therefore allowed to be moved by the force of the spring 21 so as to bring the pickup assembly 15 to the outer peripheral portion of the turn table 10.

As has been described, as the playing is completed, the power supply is stopped automatically to stop the turn table 10. At the same time, all parts and members of the record player are reset to the starting condition.

This automatic stopping and resetting operation can be effected also when the recorder is accidentally moved away from the record disc 5 during the playing, and when the play button 2 is depressed downward again, as will be seen from the following description.

During the playing, the stop button 33 is pressed upward by the record medium 5 and is held at the raised position as shown in FIG. 4. Consequently, the stop plate 36 is held at the clockwisely swung position, resisting to the force of the spring 40. However, when the record player as a whole is accidentally moved away from the record medium 5, the stop button 33 is free from the pressing force of the record medium 5 so that the stop plate 36 is swung counterclockwise by the force of the spring 40, as shown in FIG. 3. In this state, the stop button 33 is pushed out of the recess 34 of the turn table 10. As the stop plate 36 is swung counterclockwise, the projection 42 provided on the stop plate 36 comes to be positioned higher than the lower end of the heart cam plate 60 so that the lower end of the heart cam plate 60 is contacted by the projection 42 in the course of the rotation of the turn table 10. Therefore, as in the case of the contact of the projection 32 of the see-saw member 25 with the lower end of the heart cam plate 69, the heart cam plate 60 is swung away from the chassis 50, thereby to disengage the pin 68 from the heart cam 67 so that all associated members are reset to the starting condition.

During the playing, the projection 28 formed on the see-saw member 35 rests on the upper face of the tab 22, due to the weight of the see-saw member 25. However, the balance of the weight and force is lost when the record player happens to be inclined, or when an external impacting force is applied so that the see-saw member 25 is swung clockwise around the shaft 24. As a result, the columnar projection 27 comes to be positioned higher than the lower end of the heart cam plate 60. Consequently, the heart cam plate 60 is contacted by the projection 27 of the see-saw member 25, as the latter makes one rotation together with the turn table 10, so as to swing away from the chassis 50, thereby to allow the pin 68 to be disengaged from the heart cam portion 67. Consequently, all of the associated parts and members are reset to the starting condition.

In the described embodiment, the projections 32, 28 of the see-saw member 25, and the projection 42 of the stop plate 36 are tapered so that these projections may not be broken even when the turn table 10 is accidentally rotated in the direction of the arrow in FIG. 2 in the rest condition of the record player.

As has been described, according to the invention, it is possible to automatically reset the parts and members to the starting condition, when the playing of a record medium is over. This resetting to the starting condition is automatically performed also by a further depression of the play button during the playing, by movement of the record player, as a whole, away from the record medium, by turning over the player or by an externally applied impact force.

Further, a second embodiment of the invention will be described with specific reference to FIGS. 13 to 24. In this embodiment, the power of the motor for driving the turn table is efficiently utilized for diminishing the manual power required for starting the play. At the same time, it is possible to make a repeat performance over the full or a part of the record disc.

Figure 13:
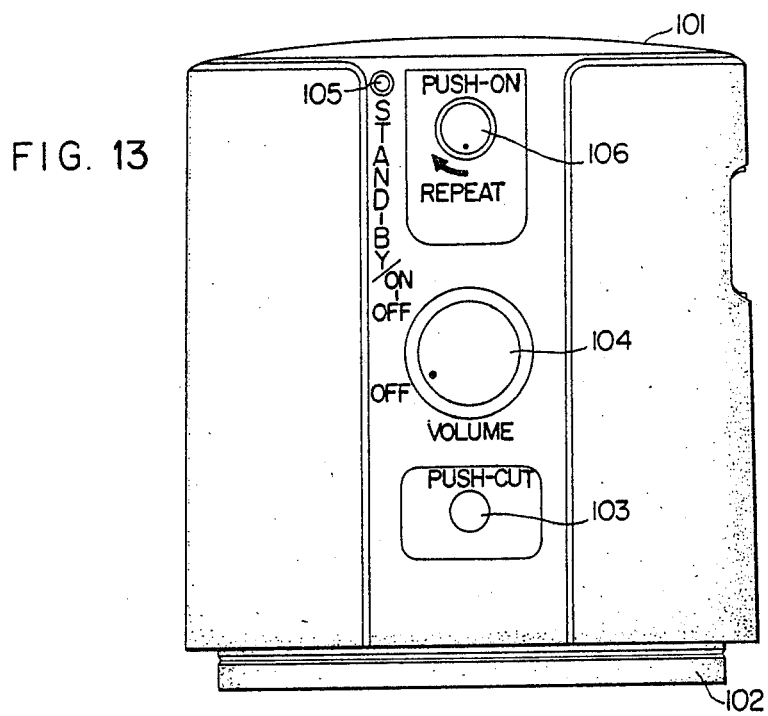

Referring first to FIG. 13 showing the control panel portion of the stationary record player 101 of this embodiment, reference numeral 102 denotes a record guide by means of which the record player 101 is aligned with the record medium 107, while reference numerals 103 and 104 designate, respectively, a cut button for optional stop and repeat of the play and a power switch provided with a volume adjust 117. A reference numeral 105 denotes a two-color light-emitting diode adapted to show whether the record player is in standby or playing condition upon the detection of the presence of the record medium. A start repeat switch for starting or repeating the playing is designated at a reference numeral 106. The play is started as this start/repeat switch button 106 is depressed, while, for a repeat performance, this switch button 106 is rotated after depression.

Figure 14A:
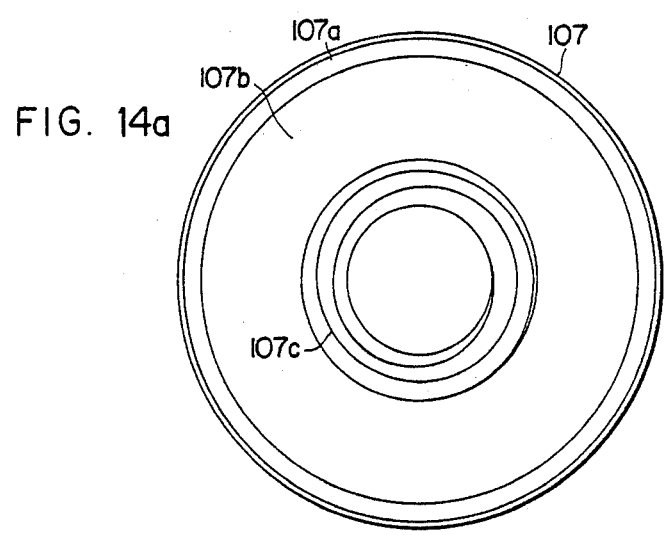
Figure 14B:
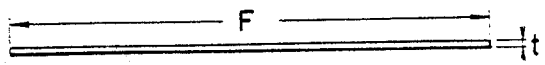

FIGS. 14a and 14b show a record medium 107 used in combination with the record player 101 in which a lead-in groove, recording grooves and a lead-out groove are designated at reference numerals 107a, 107b and 107c.

Figure 15:
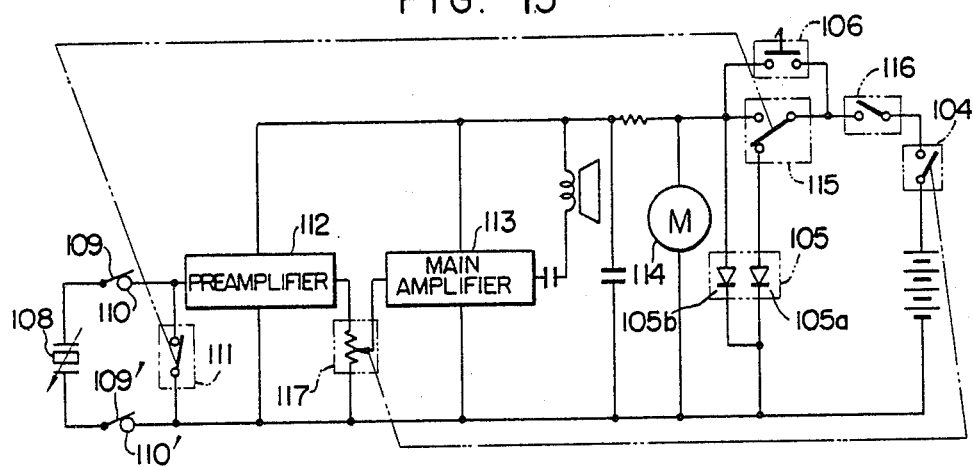

FIG. 15 shows the circuit of the record player 101 in the rest state. Reference numeral 108 denotes a pickup assembly for tracing the groove of the record medium 107 to reproduce the signal recorded on the latter. Reference numerals 109, 109′ and 110, 110′ denote, respectively, brushes and slip rings for transmitting the signals. A noise elimination switch adapted to shortcircuit the pickup assembly 108 so as to eliminate the noise during the pause is designated at a reference numeral 111. Reference numerals 112, 113 and 114 denote, respectively, a preamplifier, a main amplifier and a motor. A reference numeral 116 denotes a later-mentioned record detecting switch adapted to be opened and closed in response to whether the thickness t of the record medium 107 is detected or not.

Figure 16A:
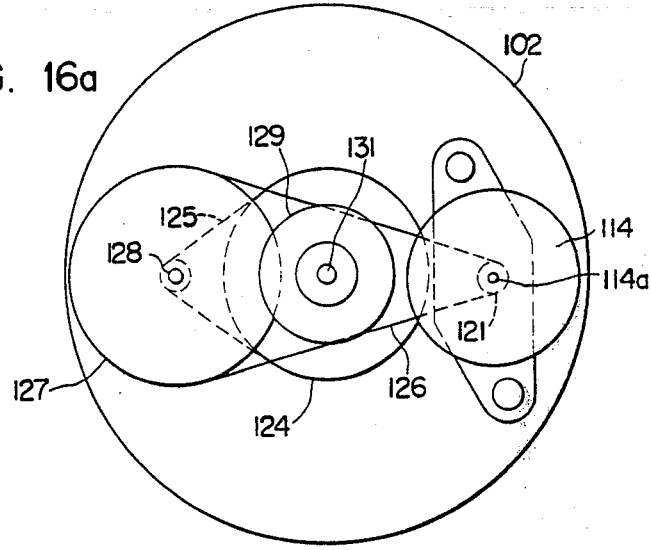
Figure 16B:
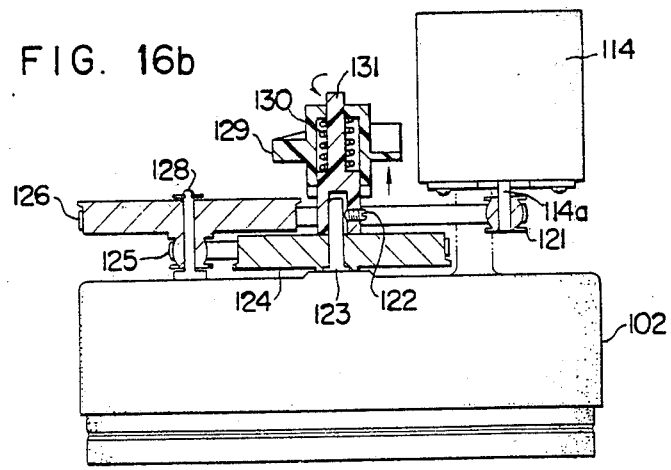

FIGS. 16a and 16b show the motor driving system of the stationary record player 101. In these Figures, a reference numeral 114 denotes the motor, 114a a motor shaft, 121 a motor pulley, 125 and 126 belts, 127 a reduction pulley, 124 a turn table pulley, 128 a pulley shaft supporting the reduction pulley 126, and 123 denotes a turn table shaft press-fitted into the turn table pulley 124. Reference numeral 129 denotes a floating cam, while 131 designates a cam shaft supporting the floating cam 129. This cam shaft 131 is connected to the turn table shaft 123, by means of lock screws 122. A compression spring for biasing the floating cam 129 upwardly is designated at a reference numeral 130.

As will be detailed later, the floating cam 129 is adapted to play the role of a clutch for optionally transmitting the power of the motor. This plays an important role in reducing the manual power and for achieving the repeating performance.

Figure 18:
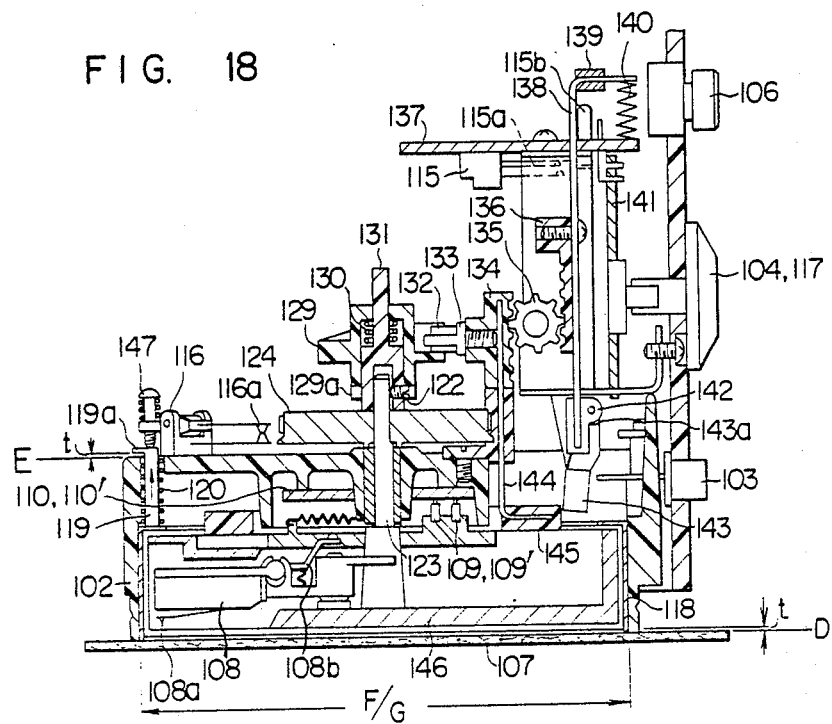

A reference numeral 118—refer to FIG. 18—denotes a record detecting ring sensitive to the thickness t of the record disc 107 and slidable up and down within the inner bore G of the record guide 102. A ring stopper 119 is adapted to locate and support the record detecting ring 118, and is normally kept in contact with the projecting end of the fine adjusting screw 147 for the opening and closing of the contact of the record detecting switch 116. The value of the detected thickness t of the record disc 107 is transmitted to the record detecting switch 116 so as to be magnified by the latter, thereby to open and close the contact 116a of the latter. Reference numeral 120 denotes a coiled spring which biases an L-shaped piece 119a of the ring stopper and the upper face E of the record guide 102 into contact with each other so as to make the record detecting ring 118 flush with the lower face D of the record guide 102. A reference numeral 145 denotes a lifting plate adapted to press a lifting arm 108b of the pickup assembly 108. This member is adapted to move the stylus 108a of the pickup assembly 108 into and out of engagement with the record medium 107 in response to the movement of the slide plate 144. A lift rack 134 is locked to the slide plate 144 by means of the threded end of the roller shaft 133 supporting the roller 132, and is adapted to rotatively drive the pinion 135. An actuating plate lock 136 is adapted to actuate the switch actuating plate 138 up and down upon engaging the pinion 135. The roller 132 loosely fitted to the roller shaft 133 is adapted to roll along the cam contour portion of the floating cam 129.

A switch pressing plate 139 is received by the L-shaped portion of the switch actuating plate 138, and is adapted to make into contact with the actuator 115b of the light-emitting diode change-over switch 115 so as to open and close the contact in the latter. A retaining pin 142 is press-fitted to the lower portion of the switch actuating plate 138. This pin 142 functions in cooperation with the recess 143a of the retaining cam 143 so as to hold the player in the operation state. The pin 142 is arranged to come into and out of the recess 143a of the retaining cam 143. Namely, this pin 142 also functions to hold the light-emitting diode change-over switch 115 and the vertical position of the lifting plate 145 in the lower position thereof. The aforementioned brushes 109, 109' are situated on the turn table 146 for transmitting the signal detected by the pickup 108 in cooperation with the slip rings 110, 110' fixed to the record guide 102. A compression spring 140 is adapted to normally bias the switch actuating plate 138 upward. Reference numerals 137 and 141 denote printed circuit boards on which the aforementioned amplifiers 112, 113 and other electric circuits are formed. The turn table 146 is rotatably supported by the record guide 102 and carries the pickup assembly 108 swingably.

Hereinafter, the operation of the record player having the described construction will be described.

Figure 17:
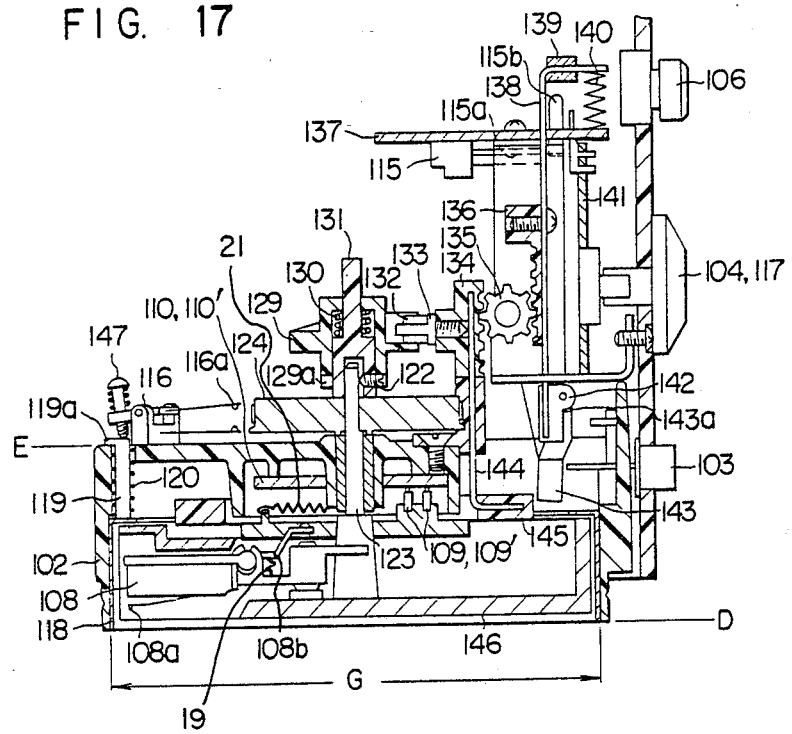

When the stationary record player 101 has not yet been placed on the record medium 107, the record detecting ring 118 is not lifted by the thickness t of the record medium 107, as will be clearly seen from FIG. 17, so that the lower face of the L-shaped piece 119a of the ring stopper 119 is kept in contact with the upper face E of the record guide 102 and the lower surface of the record detecting ring 118 is flush with the lower face D of the record guide 102. Therefore, the contact 116a of the record detecting switch 116 is kept opened. In this state, as will be understood from FIG. 15, the motor 114, amplifiers 112, 113 and other electric parts are not energized, even when the power switch 104 and the start/repeat switch 106 are closed.

In this condition, the lift plate 145 is positioned at its lowermost position so as to make into contact with the lifting arm 108b of the pickup assembly 108 to lift the latter from the lower face D of the record guide 102, thereby protecting the stylus 108a against any external force. At the same time, the switch actuating plate 138 has been moved upward to the upper-most position by the force of the compression spring 140, and is kept away from the actuator 115b of the lift-emitting diode change-over switch 115. Therefore, the contact 115a of the change-over switch 115 has been turned so as to supply a contact to the diode element 105a of the two-color light-emitting diode 105 (refer to FIG. 15). However, since the contact 116a of the record detecting switch 116 has been opened as started before, the light-emitting diode element 105a is never lit.

Meanwhile, since the lift rack 134, lift slide plate 144 and the lift plate 145 are all moved to the lowermost positions, the floating cam 129 is depressed and therefore slides down along the cam shaft 131 against the force of the compression spring 130 with the annular flange of the floating cam 129 being held in contact with the roller 132. Consequently, a claw 129a of the floating cam 129 is allowed to engage with the locking screw 122 so that the turn table shaft 123 of the turn table 150 and the floating cam 129 come into engagement with each other. In this state, the floating cam 129 can receive the driving torque from the motor 114. However, in this stage, the cam is not rotated because the power switch and the record detecting switch 116 are still opened.

FIG. 18 shows the record player 101 in the state placed on the record medium 107. In this state, the outer periphery of the record medium 107 is just received by the inner bore of the record guide 2. The record detecting ring 118 is moved upward against the force of the compression spring 120, due to the presence of the record medium 107 having the thickness t so that a gap having a thickness t is formed between the upper face E of the record guide 102 and the lower face 119a of the L-shaped section of the ring stopper 119.

Figure 25:
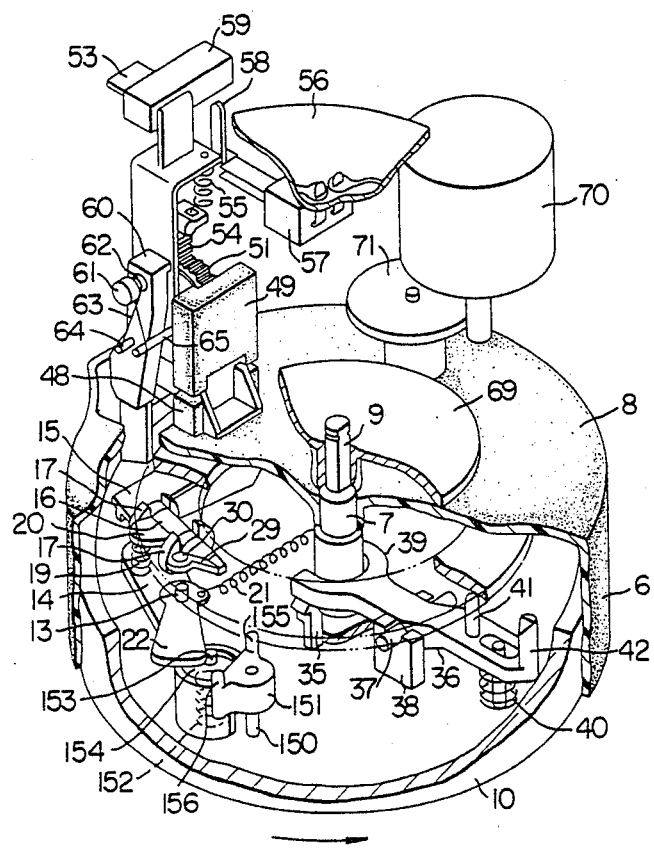
FIGS. 25 to 28 in combination show a fifth embodiment of the invention.
Figure 26:
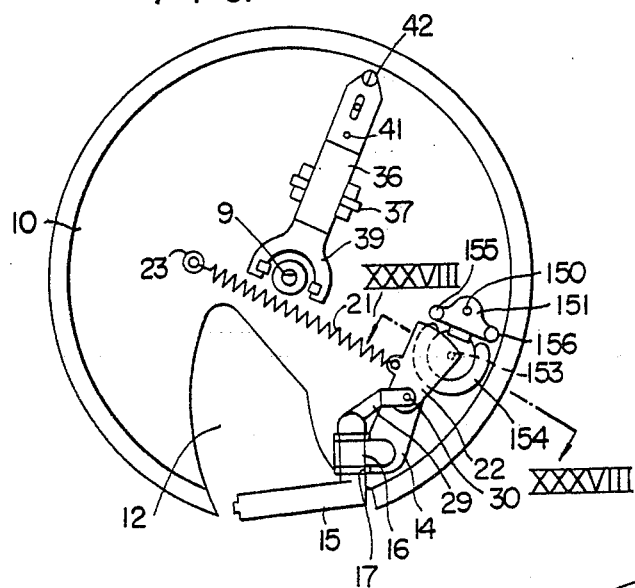
Figure 27:
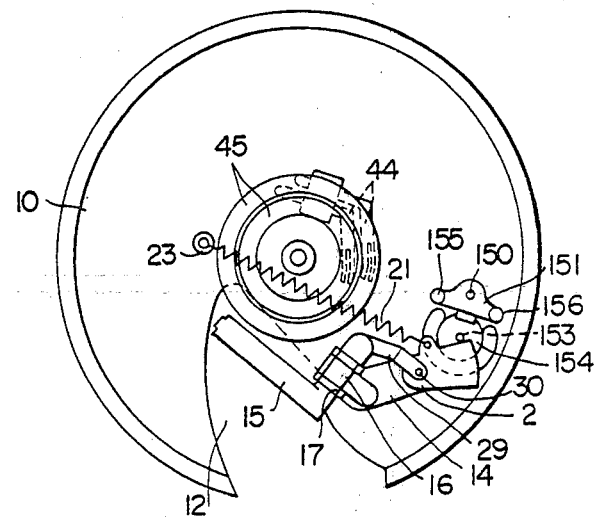

The thickness t of the record disc 107 is magnified by the record detecting switch 116. Thus the contact 116a of the latter is closed. Consequently, as will be clearly seen from FIG. 25, the element 105a of the diode 105 is energized as the power switch 104 is closed. This element 105a emits a light of a color such as green, representing the stand-by state of the record player. However, the play is not started unless the start/repeat switch 106 is closed, because the motor 114 is kept stopped until the latter is closed.

FIG. 19 shows the transition period from the stand-by state as shown in FIG. 18 to the playing condition, which is caused by an instantaneous closing of the start-/repeat switch 106. As will be seen from FIG. 15, the motor 114 is started as the start/repeat switch 106 is instantaneously closed so as to drive the turn table pulley 124 via the belts 125, 126 and the reduction pulley 127. Consequently, both of the floating cam 129 and the turn table 146 are rotated. As a result, the roller 132 loosely mounted on the roller shaft 133 by which the lift rack 134 and the lift slide plate 144 are locked rolls along the cam contour of the floating cam 129 so as to be lifted by the latter. As the result, the lift plate 145 is also lifted so as to allow the arm 108b of the pickup assembly 108 to be released from the lower surface of the lift plate 145. Therefore, the pickup assembly 108 is inclined to place the stylus 108 in the lead-in groove 107a of the record medium 107 so as to start the playing operation. At the same time, the lift rack 134 is also moved upward so as to rotate the pinion 135 clockwise, thus, the actuating plate rack 136, which is in engagement with the pinion 135 and fitted to the switch actuating plate 138, is lowered overcoming the force of the compression spring 140. At the same time, the retaining pin 142 fastened to the lower end of the switch actuating plate 138 comes to be received by the recess of the retaining cam 143, thereby to hold the lift plate 145 and the switch actuating plate 138 in their predetermined vertical position during the playing.

Meanwhile, the projecting end of the actuator 115a of the light-emitting diode change-over switch 115 is depressed by the switch pressing plate 139 so that the diode element 105a is de-energized, while the other diode element 105b is energized, as will be seen from FIG. 15. The other diode emits a light of, for example, red, which represents that the play has been started. At the same time, the switch 111 for eliminating noise is opened in relation with the turning of the light-emitting diode change-over switch from the diode 105a to 105b. In this state, since the aforementioned retaining pin 142 is received by the recess of the retaining cam 143, the motor 114 is energized, while the amplifiers 112, 113 are waiting for the reproduced signal, even if the start-/repeat switch 106 is opened.

Referring now to FIG. 20, when the turn table 146 has been further rotated, the floating cam 129 has been disengaged from the driving system so as to put the record player completely into the playing state. This state is obtained while the stylus moves along the lead-in groove 107a of the record medium. More specifically, as the highest part of the floating cam 129 in rotation has passed by the roller 132, the floating cam 129 is raised up by the force of the compression spring 130. The roller 132 may be lowered by a distance corresponding to the clearance between the retaining pin 142 and the retaining cam 143. However, any further vertical movement is prevented by the retaining pin 142 which is received by the recess of the retaining cam 143.

Consequently, the floating cam 129 is raised by the force of the spring 130 until the roller 132 comes into contact with the roller 132 so that the claw 129a of the floating cam 129 is disengaged from the locking screw 122, as will be clearly seen from the FIG. 30, and is free from the rotation of the turn table shaft 123 of the turn table 146. The floating cam 129 is retained by the roller and the cam shaft 131 which is rotating together with the turn table shaft 123 freely rotates in the central bore of the floating cam 129. In this state, the load of the vertical movement of the switch actuating plate 138 and the lift plate 145, which have been operated by the floating cam 129, is removed from the record playing mechanism due to the engagement of the retaining pin 142 with the retaining cam 143 so as to put the record player completely into the playing state.

Figure 28:
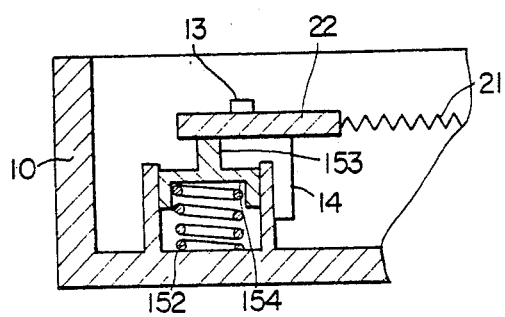

The stylus 108a of the pickup 108, which has been moved along the recording groove 107b, then moves into the lead-out groove 107c. In this state, although not shown, an automatic stop pin mounted on the turn table 146 is projected to contact to the lower end of the retaining cam 143 so that the recess 143a of the retaining cam 143 is disengaged from the retaining pin 142 fitted to the lower end of the switch actuating plate 138, in the direction of rotation of the turn table 146. Consequently, the switch actuating plate 138 is moved vertically by the compression spring 146 so that the switch actuating plate rack 136, pinion 135 and the lift rack 134 are reversely actuated to lower the lift plate 145, thereby to retract the pickup assembly 108 from the position below the lower surface D of the record guide 102, into the body of the record player. At the same time, the stylus 108a is disengaged from the lead-out groove 107c and is moved back to the starting position above the lead-in groove 107a by the force of a spring (not shown) provided in the turn table 146. Namely, the record player resumes the stand-by state as shown in FIG. 28, and the play is stopped. As stated before, since the record player is correctly placed on the record medium in this state, both of the record detecting switch 116 and the power switch 104 are kept closed. At the same time, the light-emitting diode change-over switch 15 has been turned to select the stand-by display element 105a so as to keep the latter on.

Then, as the record detecting switch 116 is opened by removing the record player as a whole from the record disc 101, or as the power switch 104 is opened, the light-emitting diode 105 is de-energized and the record player is turned into the completely stopped condition. The above description is for explaining the ordinary playing operation of the record player.

Figure 21:
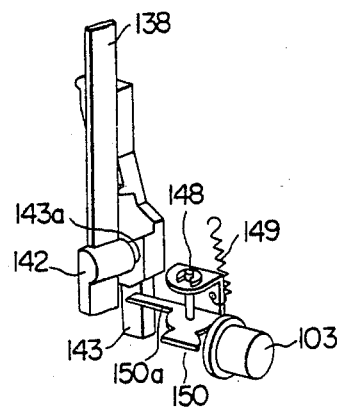
Figure 22:
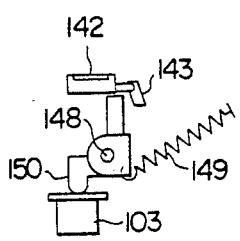
Figure 23:
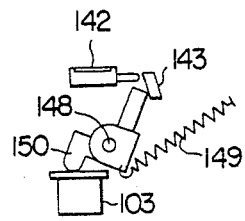
Figure 24:
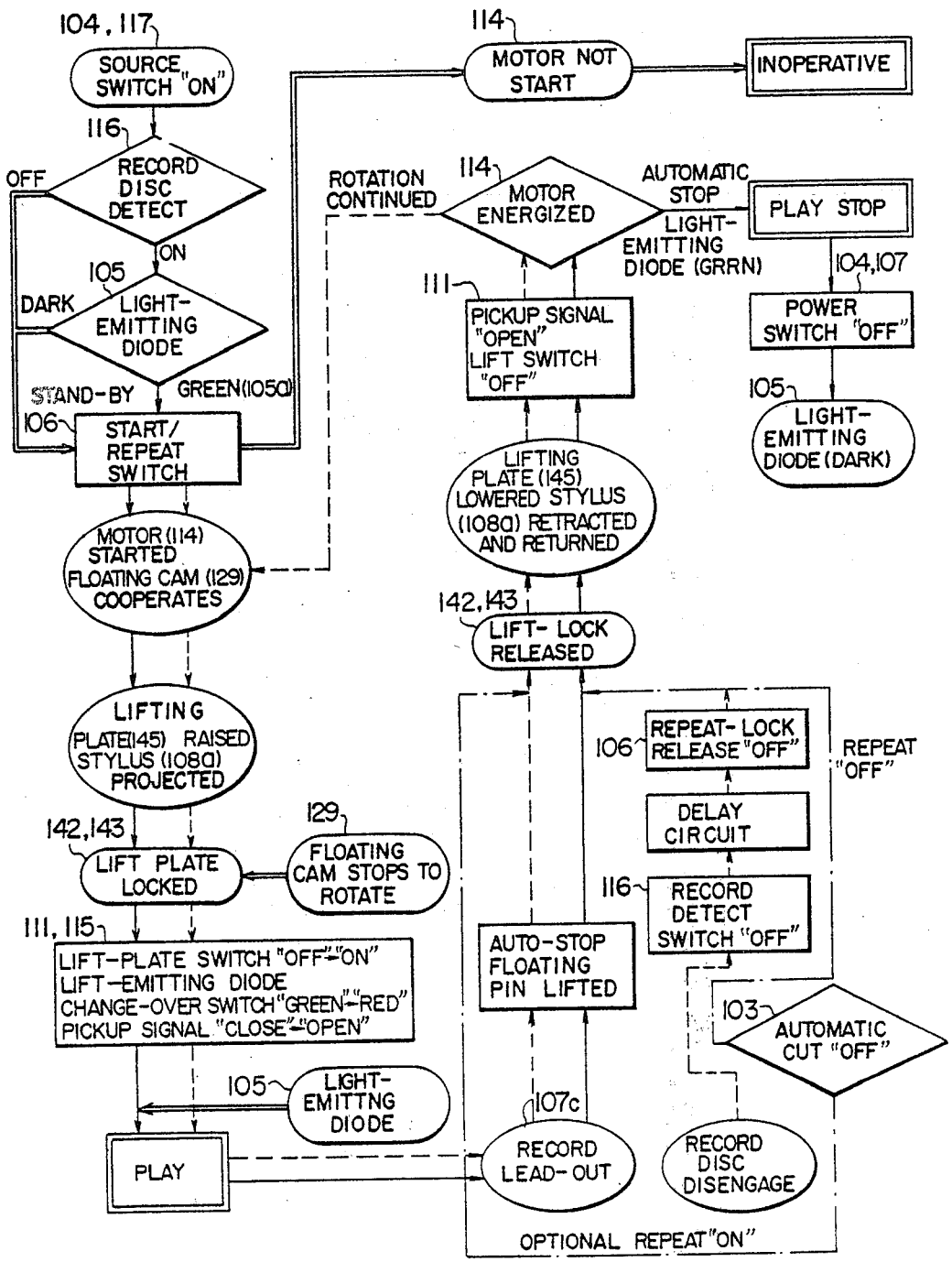

Hereinafter, an explanation will be made as to the optional repeating playing and optional stopping operations, with specific reference to FIGS. 21, 22 and 33.

For stopping the play at any desired moment, the cut button 103 is depressed to cause a clockwise rotation of the cut lever 150 around the axis of the cut lever support shaft 148, overcoming the force of the tension spring 149. Consequently, the lower end surface of the retaining cam 143 is pressed by the projecting end 150a of the cut lever 150 so that the retaining pin 142 fastened to the lower end of the switch actuating plate 138 is disengaged from the recess 143a of the retaining cam 143. As a result, the record player is reset to the stand-by state as shown in FIG. 18 in the same manner as the final automatic stopping in the ordinary playing operation. It is thus possible to stop the play at any desired moment.

Referring now to the repeat playing operation, this operation is initiated by rotating and locking the start-/repeat switch 106. The repeat playing over the entire part of the record medium is effected in the following manner. The start/repeat switch 106 is locked in the closed state, at the time of starting of the playing or during the playing. Then, the aforementioned final automatic stopping mechanism functions in the stage as shown in FIG. 20 so as to reset the record player to the stand-by state as shown in FIG. 18. Thus, the lift plate 145 comes to assume the lowermost position to that the pickup 108 is lifted to disengage the stylus 108a from the lead-out groove of the record medium 107. The stylus is then returned to the position above the lead-in groove 107a, clearing the record medium 107. Simultaneously with the returning of the stylus 108a, the float cam 129 is depressed overcoming the force of the compression spring 130, due to the lowering of the lift slide plate 144, while keeping the contact with the roller 125 at its lowermost part. Consequently, the claw 129a of the floating cam 129 comes to be received by the locking screw 124 so that the float cam is operatively connected to the rotation of the turn table. In other words, the clutch between the floating cam 129 and the turn table 146 is engaged.

In this state, since the start/repeat switch 106 has been closed as stated before, the motor continues to rotate so that the floating cam 129 is rotated together with the turn table 129. Consequently, the roller 132 rolls and slides along the cam contour of the floating cam 129 so as to be lifted by the latter from the lowermost part of the cam nearly to the uppermost part of the same. As a result, the lift rack 134 is moved upward so as to rotate the pinion 135 clockwise, causing a downward movement of the switch actuating plate rack 136. As the switch actuating plate 138 is lowered, the retaining pin 142 at the lower end of the same plate 138 comes to be received by the recess 143a of the retaining cam 143. At the same time, since the lift rack 134 is moved upward as stated above, the lift plate 145 is moved upward. Consequently, the arm 108b of the pickup assembly 108 is released to cause the pickup assembly 108 to be inclined so as to bring the stylus 108a into engagement with the lead-in groove 107a of the record disc 107. This state of the record player is shown in FIG. 19. As the floating cam 129 further rotates, the highest part of the floating cam 129 passes the roller 132 so that the floating cam 129 is lifted up by the force of the compression spring 130. Consequently, the claw 129a of the floating cam 129 is disengaged from the locking screw 122 to put the record player into the ordinary playing condition. This operation is repeated as long as the start/repeat switch 106 is kept closed at each time when the stylus 108a has been moved into the lead-out groove 107c of the record medium 107.

For obtaining an optional repeat operation, i.e. for repeatedly performing the playing over a desired part of the record medium, the start/repeat switch 106 is locked at the closed state, in the playing operation as shown in FIG. 20. As the aforementioned cut button 102 is depressed, the stylus 108a of the pickup assembly 108 is returned to the starting position above the lead-in groove 107a of the record medium 107, even when the stylus 108a is moving along the recording groove 107b i.e. even in the midway of the play, in the same manner as that effected by the final automatic repeating operation. The stylus 108a is then put in the lead-in groove 107a so as to start the play from the beginning. This operation can be obtained at any time by any desired number of repetitions.

The construction and operation of the stationary record player of the invention have been described fully. To make sure of the understanding of the invention, the whole operation of the player is summarized and illustrated in FIG. 24. In this Figure, the full line shows the ordinary playing system. Similarly, the system for repeat playing over the full part of the record medium and the system for repeat operation over the desired part of the record medium are shown by broken lines and one-dot-and-dash lines, respectively. Double parallel full lines show the inoperative system.

As has been described, in this fourth embodiment of the invention, the motor for driving the turn table is instantaneously energized at the time of starting of the play so as to rotate the turn table. The circuit for supplying the electric power to the motor is then completed by making use of the torque of the turn table. Once the circuit is closed, the motor can continue the rotation. Therefore, for starting the record player, the operator has only to touch the switch for causing the energization of the motor. Thus, the record player of this embodiment exhibits a much superior operability to the conventional player in which the lever is depressed and locked mechanically.

In addition, by continuously supplying the electric power to the motor, and by arranging such that the playing state can be dismissed as the playing is finished or on the midway of the playing, it becomes possible to obtain a repeat playing through the action of a connecting means.

Further, it is possible to eliminate unfavourable noise in the transient period between successive playings in the repeat playing mode, by arranging such that the noise eliminating switch is automatically operated when the record player is reset to the stand-by state.

In any case, a simple construction and a safe operation can be obtained by adopting a floating cam as the clutch means which connects and disconnects the turn table to and from the driving means.

A fifth embodiment of the invention will be described with specific reference to FIGS. 25 to 28. This embodiment is similar to the first embodiment described with specific reference to FIGS. 1 to 12, excepting that the see-saw member 25 described in the first embodiment will be changed into lift member 151. In FIGS. 25 to 28, a reference numeral 160 denotes a shaft which is provided at the inside of the turn table 10. Lift member 151 is loosely mounted onto the shaft 160 and pressed upwardly by the spring 152 which biases a tongue 154 integrally interpolated with lift medium 151. A projection 153 formed on the upper surface of a tongue 154 of the lift member 151 normally applies a biasing force by the spring 152 to a sector tab 22 and is kept in contact with the sector tab 22 during playing operation. Projections 155 and 156 are formed on the upper surface of the lift member 151 and are adapted to contact with lift plate 46. Thus, it is possible to negate the radially outward biasing force acting on the pickup assembly, i.e. the force of the spring 21 and the centrifugal force due to the rotation of the pickup 15, by making use of the mutual contact of the projection 153 and the sector-shaped tab 22. Also the friction between sector-shaped tab 22 and the projection 153 damps the movement of the pickup assembly 15, therefore the pickup assembly 15 does not vibrate with the stylus 18 when the stylus traces the groove of the record medium.

What is claimed is:

1. A stationary record player having a turn table rotatively driven by a motor, and a pickup pivotally secured to said turn table so as to trace the track of a stationary record medium whereby a signal is produced in response to the relative motion between said track and pickup further comprising:
   (a) switch means for momentarily supplying an energizing current to said electric motor in response to a manual actuating force;
   (b) means for positioning said pickup from a rest position into playing contact with said track, said means including a lift plate means mounted for vertical movement, said lift plate means being movable in response to a driving torque, and a biasing means for biasing one end of said pivotally mounted pickup against said lift plate whereby movement of lift plate pivots said pickup;
   (c) clutch means operatively connected to said means for positioning and said turn table, said clutch means providing a momentary driving torque to said means for positioning in response to an initial rotation of said turn table; whereby said pickup is positioned in contact with said track; and
   (d) means for energizing said motor continuously when said pickup is placed in playing contact with said track.

2. A stationary record player according to claim 1, wherein said clutch means comprises a cam shaft rotating with said turn table; a floating cam member concentric with said cam shaft and movable along the axis of said cam shaft, said floating cam member having a claw for engaging a locking screw of said cam shaft, said floating cam member having a surface for imparting a linear motion to a member residing thereon in response to the rotation of said floating cam member; and a member coupling said surface to said means for positioning said pickup for moving said pickup into playing contact with the record track of the stationary record medium.

3. A stationary record player having a turn table driven by a motor, a pickup pivotally supported to said turn table so as to trace when rotated together with said turn table the recording groove of a stationary record medium so as to reproduce the signal recorded in said record medium, means for retracting said pickup to a rest position away from said record surface at the conclusion of the tracing of said track further comprising:
   (a) means for energizing said motor whereby said turn table is continuously rotated;
   (b) driving means for placing said pickup at the beginning point of said record medium track from the rest position in response to a momentary torque, said driving means including a lift plate means mounted for vertical movement and a biasing means for biasing said pickup against said lift plate, whereby vertical movement of said lift plate permits said pickup to pivot into communication with said recording grooves; and
   (c) clutch means coupling said driving means with said turn table, said clutch means providing a momentary torque to said driving means for placing said pickup at the beginning point of said record medium track when said motor receives an energizing current.

4. The stationary record player of claim 3, wherein said lift plate moves in a vertical direction pivoting said pickup in response to momentary torque produced by said turn table.

5. The apparatus of claim 4, further including means for returning said pickup to a rest position when said pickup is at a position intermediate the beginning and end points of said track.

6. The apparatus of claim 4, wherein said clutch means comprises a floating cam coupled through a rotating cam shaft to said turn table, said floating cam being momentarily engaged with said cam shaft during the initial rotation of said turn table, said floating cam having a surface for engaging said driving means whereby a linear motion is imparted to said driving means for positioning said pickup.

7. A stationary record player as set forth in claim 3, characterized in that a noise-eliminating switch disposed in the transmission path of the reproduced signal is actuated when said pickup are reset to said inoperative position.

* * * * *